United States Patent [19]
DeMont

[11] Patent Number: 5,920,878
[45] Date of Patent: Jul. 6, 1999

[54] METHOD FOR HIDING A BINARY ENCODED MESSAGE IN AN ELECTRONIC DOCUMENT BY MODULATING THE CASE OF THE CHARACTERS IN A CASE-INSENSITIVE MARKUP LANGUAGE

[76] Inventor: Jason Paul DeMont, 244 English Pl., Basking Ridge, N.J. 07920

[21] Appl. No.: 08/748,777

[22] Filed: Nov. 14, 1996

[51] Int. Cl.⁶ .............................. G06F 17/21; H04L 9/28
[52] U.S. Cl. .............................. 707/513; 707/531; 380/4; 283/72
[58] Field of Search .................................. 707/500, 513, 707/531; 380/4, 23, 25; 283/72

[56] References Cited

U.S. PATENT DOCUMENTS

| | | | |
|---|---|---|---|
| 5,428,529 | 6/1995 | Hatrick et al. | 707/513 |
| 5,532,920 | 7/1996 | Hatrick et al. | 707/513 |
| 5,629,770 | 5/1997 | Brassil et al. | 380/4 |
| 5,721,827 | 2/1998 | Logan et al. | 395/200.47 |
| 5,818,933 | 10/1998 | Kambe et al. | 380/4 |

OTHER PUBLICATIONS

"The Codebreakers, The Story of Secret Writing," David Kahn, The Macmillan Company, 1967, p. xiii, p. 81 (second and third paragraphs, in particular); an pp. 516–522 (pp. 519, second paragraph to 522, in particular). Jan. 1967.

*Primary Examiner*—Mark R. Powell
*Assistant Examiner*—Jeffrey Allen Rossi

[57] ABSTRACT

Embodiments of the present invention are capable of hiding a message, such as, for example, a copyright notice or other indicium of authorship, in an electronic document. An illustrative embodiment of the present invention comprises encoding an electronic document with a plurality of tags from a case insensitive markup language; and modulating the case of at least one tag character in at least one of said plurality of tags with a binary string, wherein the binary string represents a message to be hidden in the electronic document.

10 Claims, 7 Drawing Sheets

```
Ellen's Chili

Ingredients:
1 lb. lean hamburger
1 medium onion
30 oz. tomato sauce
2 t. chili powder
1 clove garlic
2 t. Worchestershire sauce
15 oz. canned light red kidney beans
15 oz. canned dark red kidney beans Cooking Instructions:
Brown meat, onion and garlic
Place in crock pot
Add remaining ingredients
Cook on high for 3-4 hours
```

FIG. 3

```
<HTML>
<HEAD>
<TITLE>Ellen's Chili</TITLE>
</HEAD>
<BODY>
<CENTER><H4>Ellen's Chili</H4></CENTER>
<H4>Ingredients:</H4>
<OL>
<LI>1 lb. lean hamburger
<LI>1 medium onion
<LI>30 oz. tomato sauce
<LI>2 t. chili powder
<LI>1 clove garlic
<LI>2 t. Worchestershire sauce
<LI>15 oz. canned light red kidney beans
<LI>15 oz. canned dark red kidney beans
</OL>
<H4>Cooking Instructions:</H4>
<OL>
<LI>Brown meat, onion and garlic
<LI>Place in crock pot
<LI>Add remaining ingredients
<LI>Cook on high for 3-4 hours
</OL>
</BODY>
</HTML>
```

Ellen's Chili

Ingredients:

1. 1 lb. lean hamburger
2. 1 medium onion
3. 30 oz. tomato sauce
4. 2 t. chili powder
5. 1 clove garlic
6. 2 t. Worchestershire sauce
7. 15 oz. canned light red kidney beans
8. 15 oz. canned dark red kidney beans

Cooking Instructions:

1. Brown meat, onion and garlic
2. Place in crock pot
3. Add remaining ingredients
4. Cook on high for 3-4 hours

FIG. 5

```
<html>
<head>
<title>Ellen's Chili</title>
</head>
<body>
<center><h4>Ellen's Chili</h4></center>
<h4>Ingredients:</h4>
<ol>
<li>1 lb. lean hamburger
<li>1 medium onion
<li>30 oz. tomato sauce
<li>2 t. chili powder
<li>1 clove garlic
<li>2 t. Worchestershire sauce
<li>15 oz. canned light red kidney beans
<li>15 oz. canned dark red kidney beans
</ol>
<h4>Cooking Instructions:</h4>
<ol>
<li>Brown meat, onion and garlic
<li>Place in crock pot
<li>Add remaining ingredients
<li>Cook on high for 3-4 hours
</ol>
</body>
</html>
```

FIG. 6

```
<hTml>
<heAD>
<TiTle>Ellen's Chili</tITle>
</heAd>
<bOdy>
<CENter><h4>Ellen's Chili</h4></ceNTer>
<h4>Ingredients:</H4>
<oL>
<Li>1 lb. lean hamburger
<Li>1 medium onion
<LI>30 oz. tomato sauce
<Li>2 t. chili powder
<li>1 clove garlic
<lI>2 t. Worchestershire sauce
<li>15 oz. canned light red kidney beans
<LI>15 oz. canned dark red kidney beans
</Ol>
<h4>Cooking Instructions:</h4>
<OL>
<li>Brown meat, onion and garlic
<LI>Place in crock pot
<li>Add remaining ingredients
<Li>Cook on high for 3-4 hours
</ol>
</bODy>
</HTml>
```

FIG. 7

```
<HtMl>
<HeaD>
<tiTle>Ellen's Chili</title>
</HEad>
<bOdy>
<CENteR><h4>Ellen's Chili</h4></CENteR>
<h4>Ingredients:</h4>
<OL>
<lI>1 lb. lean hamburger
<Li>1 medium onion
<li>30 oz. tomato sauce
<Li>2 t. chili powder
<li>1 clove garlic
<li>2 t. Worchestershire sauce
<lI>15 oz. canned light red kidney beans
<li>15 oz. canned dark red kidney beans
</Ol>
<H4>Cooking Instructions:</h4>
<oL>
<lI>Brown meat, onion and garlic
<li>Place in crock pot
<li>Add remaining ingredients
<lI>Cook on high for 3-4 hours
</ol>
</bOdy>
</html>
```

FIG. 8

START → RECOVER THE BINARY STRING BY DEMODULATING THE MODULATED TAG CHARACTERS IN THE ELECTRONIC DOCUMENT — 801 → RECOVER BINARY STRING FROM ERROR CORRECTION CODES, IF USED — 803 → CONVERT BINARY STRING BACK INTO ORIGINAL MESSAGE — 805 → STOP

FIG. 9

```
<HtMl>
<HeaD>
<tiTlE>Bob's Original Hot Hot Hot Chili</title>
</HEad>
<bOdy>
<CENteR><h4>Bob's Original Hot Hot Hot Chili</h4></CENteR>
<h4>Ingredients:</h4>
<OL>
<lI>1 lb. lean hamburger
<Li>1 medium onion
<li>30 oz. tomato sauce
<Li>4 t. chili powder
<li>1 clove garlic
<li>2 t. Worchestershire sauce
<lI>15 oz. canned light red kidney beans
<li>15 oz. canned dark red kidney beans
</Ol>
<H4>Cooking Instructions:</h4>
<oL>
<lI>Brown meat, onion and garlic
<li>Place in crock pot
<li>Add remaining ingredients
<lI>Cook on high for 3-4 hours
</ol>
</bOdy>
</html>
```
— 901

METHOD FOR HIDING A BINARY ENCODED MESSAGE IN AN ELECTRONIC DOCUMENT BY MODULATING THE CASE OF THE CHARACTERS IN A CASE-INSENSITIVE MARKUP LANGUAGE

FIELD OF THE INVENTION

The present invention relates to steganography in general, and, more particularly, to a method for hiding a message in an electronic document.

BACKGROUND OF THE INVENTION

The copyright law grants an author of an original work limited rights to assist the author in harvesting the rewards of his or her labor and creativity. These rights include the right to preclude others from reproducing and distributing the copyrighted work. Although both electronic and paper documents are copied by infringers, the ease with which electronic documents can be copied, edited and reproduced exacerbates the problem of providing evidence that an accused infringer has, in fact, copied the accused infringing work from the original work.

In some cases, the subject matter of the original work is new (e.g., a novel, a song, a painting) and evidence of copying can be shown by comparing the similarity between the original work and that of the accused infringing work. When, however, the subject matter underlying an original work is not new because it is in the public domain, the author may have difficulty providing evidence of copyright infringement because the original work and the accused infringing work should be similar (since both works are representative of the same underlying subject matter). Examples of original works whose underlying subject matter is in the public domain include, for example, a map of Virginia, a telephone directory of businesses in Arlington, a compilation of trigonometric tables, a compilation of government documents, etc.

Several techniques are used to help authors and publishers show copyright infringement in works whose underlying subject matter is not new. The first technique is commonly used by publishers of maps and involves "seeding" the map with errors. The theory being that if an accused infringer copies the original map, the infringer's map will contain the seeded errors, which it would not had the accused infringer created his or her map from original research. Similarly, the publishers of telephone directories and other compilations often seed their directories with fictitious entries, under the same theory. A problem with these approaches, however, is that they affect the fidelity of the original work.

SUMMARY OF THE INVENTION

Embodiments of the present invention are capable of hiding a message, such as, for example, a copyright notice or other indicium of authorship or ownership, in an electronic document without some of the costs and restrictions associated with methods in the prior art. In particular, a message can be hidden in an electronic document: (1) without affecting the fidelity of the document's subject matter, (2) without increasing the number of bytes in the document, (3) without affecting the formatting of the document when printed or viewed through a browser, and (4) such that a copyright infringer is likely to unknowingly copy the hidden message into the infringing work when he or she copies the original work. If the copyright infringer copies the hidden message into the infringing work, the original author can provide evidence of copyright infringement by retrieving, in court if necessary, the hidden message from the accused infringing work.

An illustrative embodiment of the present invention comprises encoding an electronic document with a plurality of tags from a case insensitive markup language; and modulating the case of at least one tag character in at least one of said plurality of tags with a binary string, wherein said binary string represents a message to be hidden in said electronic document.

DETAILED DESCRIPTION

Figure 1:
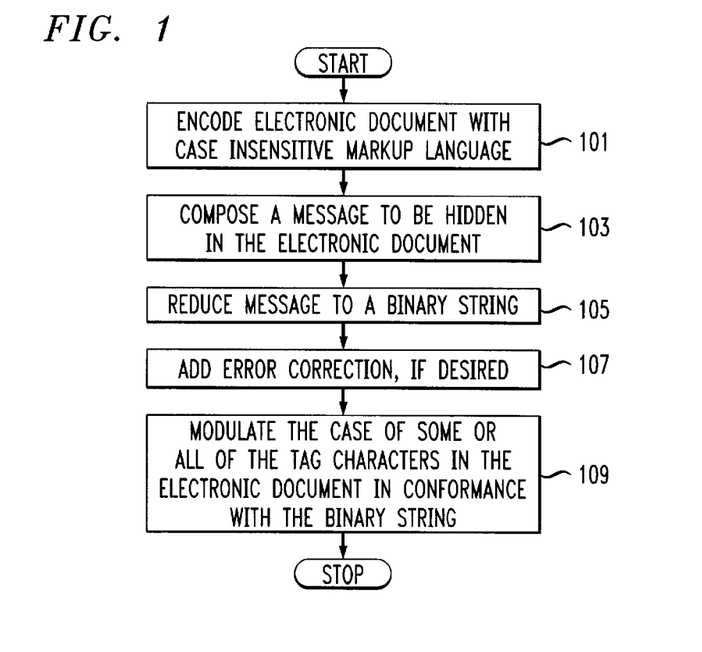
FIG. 1 depicts a flowchart of an illustrative embodiment of the present invention.

FIG. 1 depicts a flowchart of the steps performed by an illustrative embodiment of the present invention that is suitable for implementation in custom hardware, as an appropriately programmed general purpose processor, or as a combination of the two. It will also be clear to those skilled in the art that many of the depicted operations can be parallelized.

The method begins at step 101 with the encoding of the electronic document with a "case insensitive markup language." The electronic document can comprise text, graphics, photographs or other multimedia elements, and it will be clear to those skilled in the art how to make and use such an electronic document.

For the purposes of this specification, a "markup language" is a collection of tags that are used to format an electronic document, usually for printing on a printer or for viewing with a "browser". Markup languages are well known to those skilled in the art and include nroff, troff, $T_EX$, SGML, HTML, RTF, Word 6.0 and WordPerfect 6.0.

For the purposes of this specification a "case insensitive markup language" is a markup language in which the case of one or more of the characters in the language's tags are irrelevant to the syntax of the language. For example, HTML is a case insensitive markup language because the HTML tag <P> with a capital "P" creates exactly the same effect (starting a new paragraph) as does the HTML tag <p> with a small "p". Furthermore, the HTML tags <BR>, <Br>, <bR> and <br> all cause a line break. It will be clear to those skilled in the art how to determine which markup languages are case insensitive.

Typically, the electronic document resides in a computer's memory and the encoding is performed by a text editor (e.g., ed, vi, emacs, etc.), word processor (e.g., Microsoft Word, WordPerfect) or markup editor (e.g., Adobe Pagemill, HoTMetaL Pro, Netscape Navigator Gold, etc.) under the direction of a human user. Alternatively, the encoding of the electronic document can be partially or totally automated and performed by an appropriately programmed general purpose computer.

Figure 2:
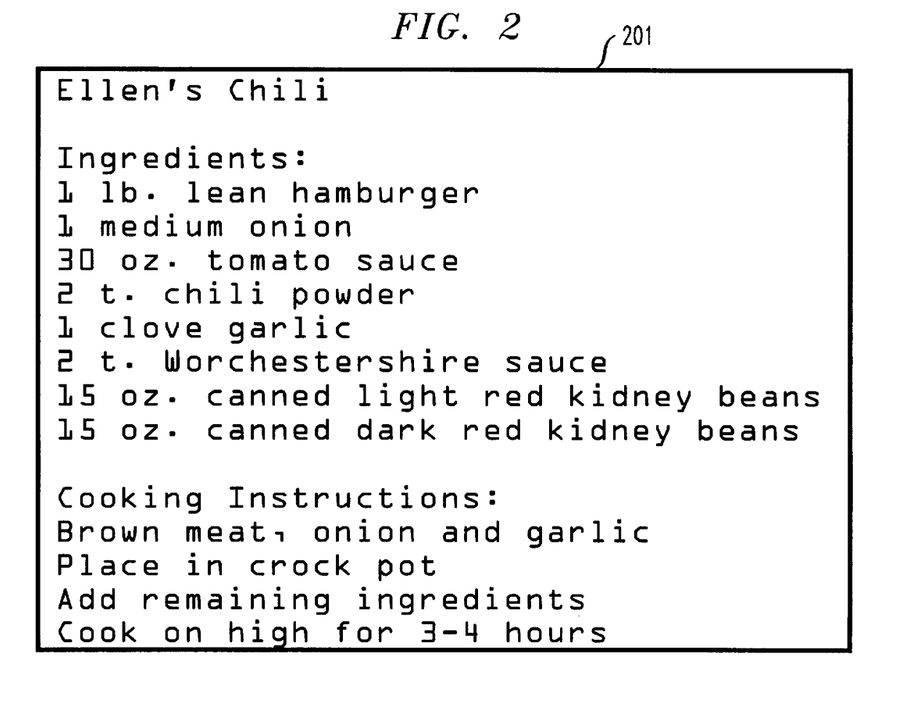
FIG. 2 depicts the contents of an electronic document.

For pedagogical purposes, the illustrative embodiment in FIG. 1 is presented as it operates on a illustrative electronic document. FIG. 2 depicts the text of the illustrative electronic document before it is encoded with a markup language. Although this document comprises only text, it will be clear to those skilled in the art how, using a markup language, to construct documents or "pages" that also comprise graphics, photographs, motion pictures and other multimedia elements.

Figure 3:
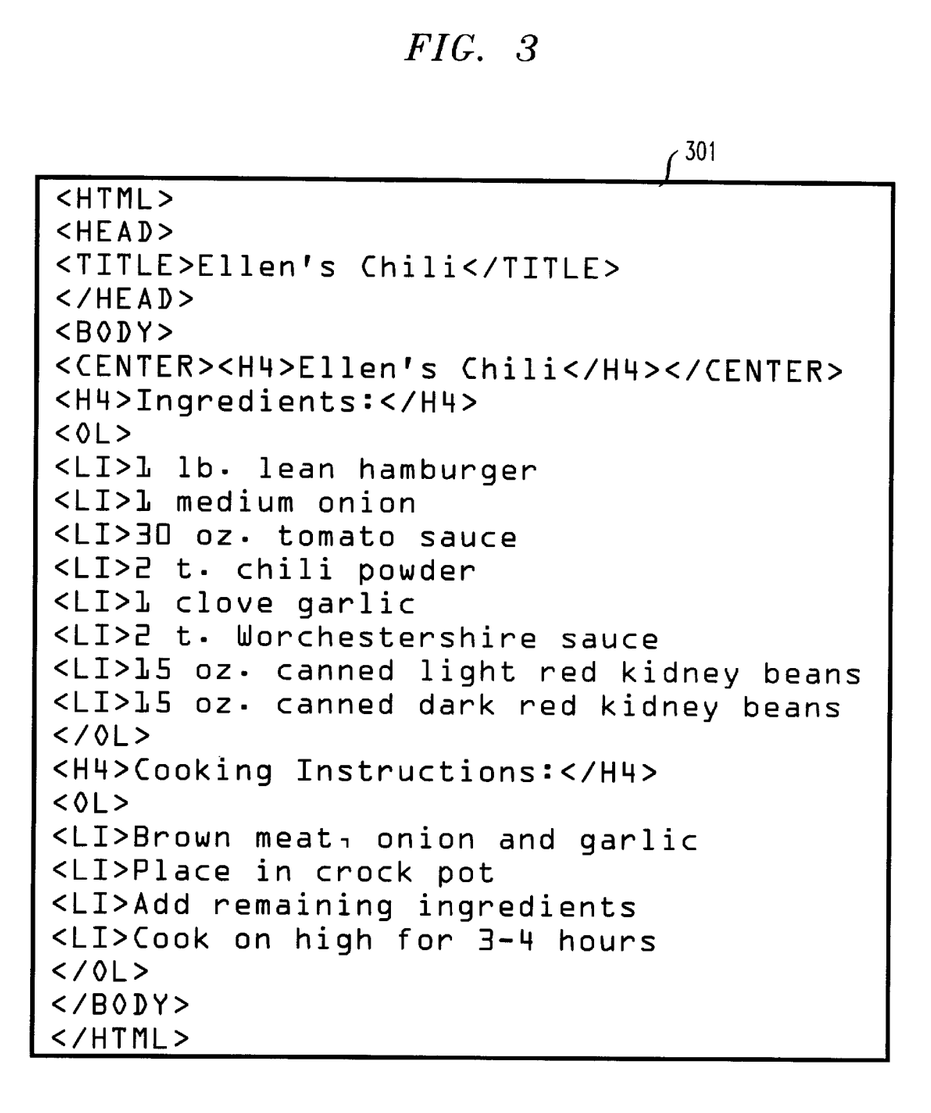
FIG. 3 depicts the contents of the electronic document in FIG. 2 after it has been encoded with HTML, wherein all of the tag characters are in uppercase.

FIG. 3 depicts how the illustrative document of FIG. 2 appears after it has been encoded with HTML. Note that all of the tag characters are in uppercase in the document of FIG. 3.

Figure 4:
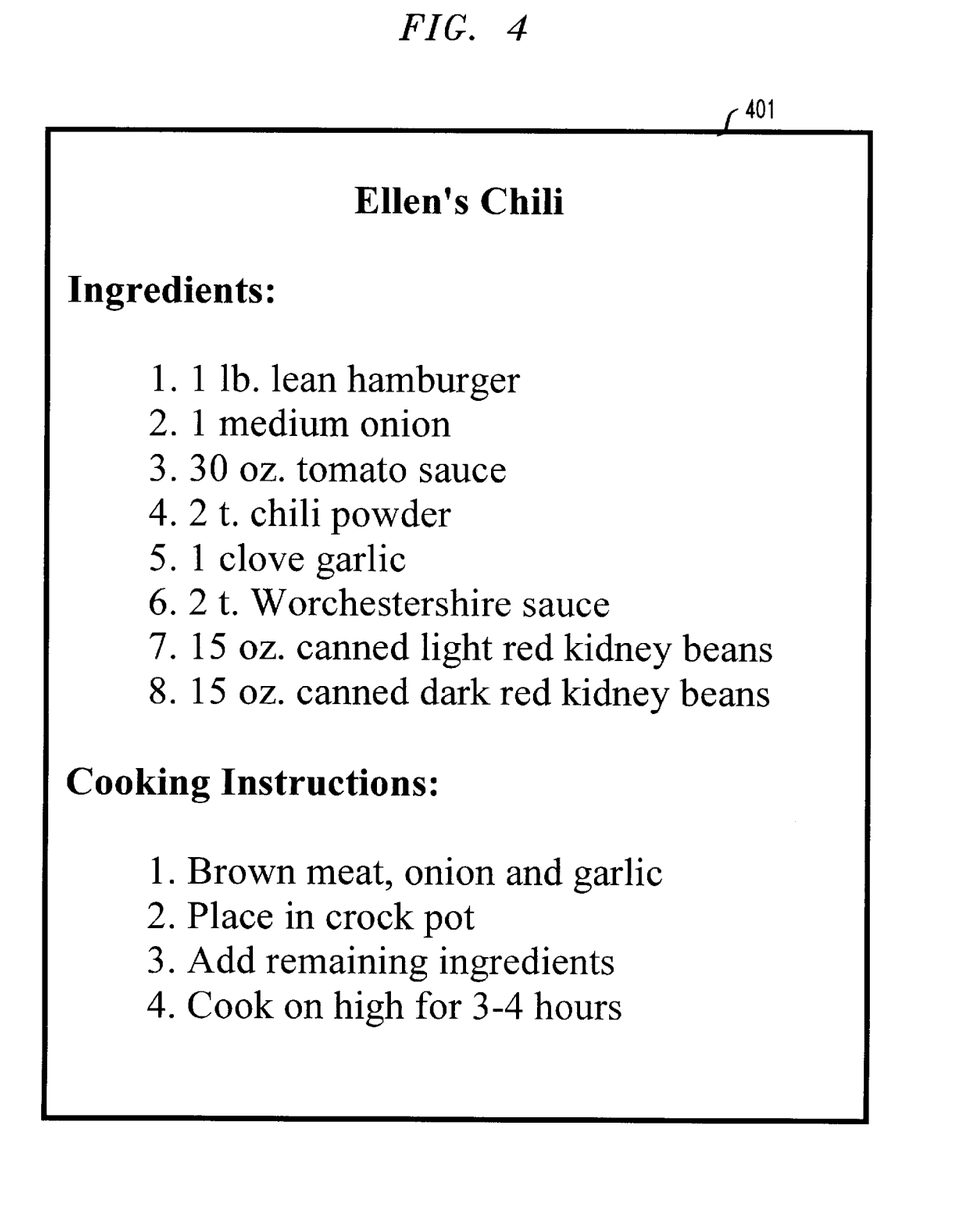
FIG. 4 depicts how the encoded electronic document of FIG. 3, FIG. 5, FIG. 6 and FIG. 7 appears when printed or viewed through a browser.

FIG. 4 depicts how the encoded document of FIG. 3 appears when viewed through an HTML browser such as the Netscape Navigator or the Internet Explorer.

Figure 5:
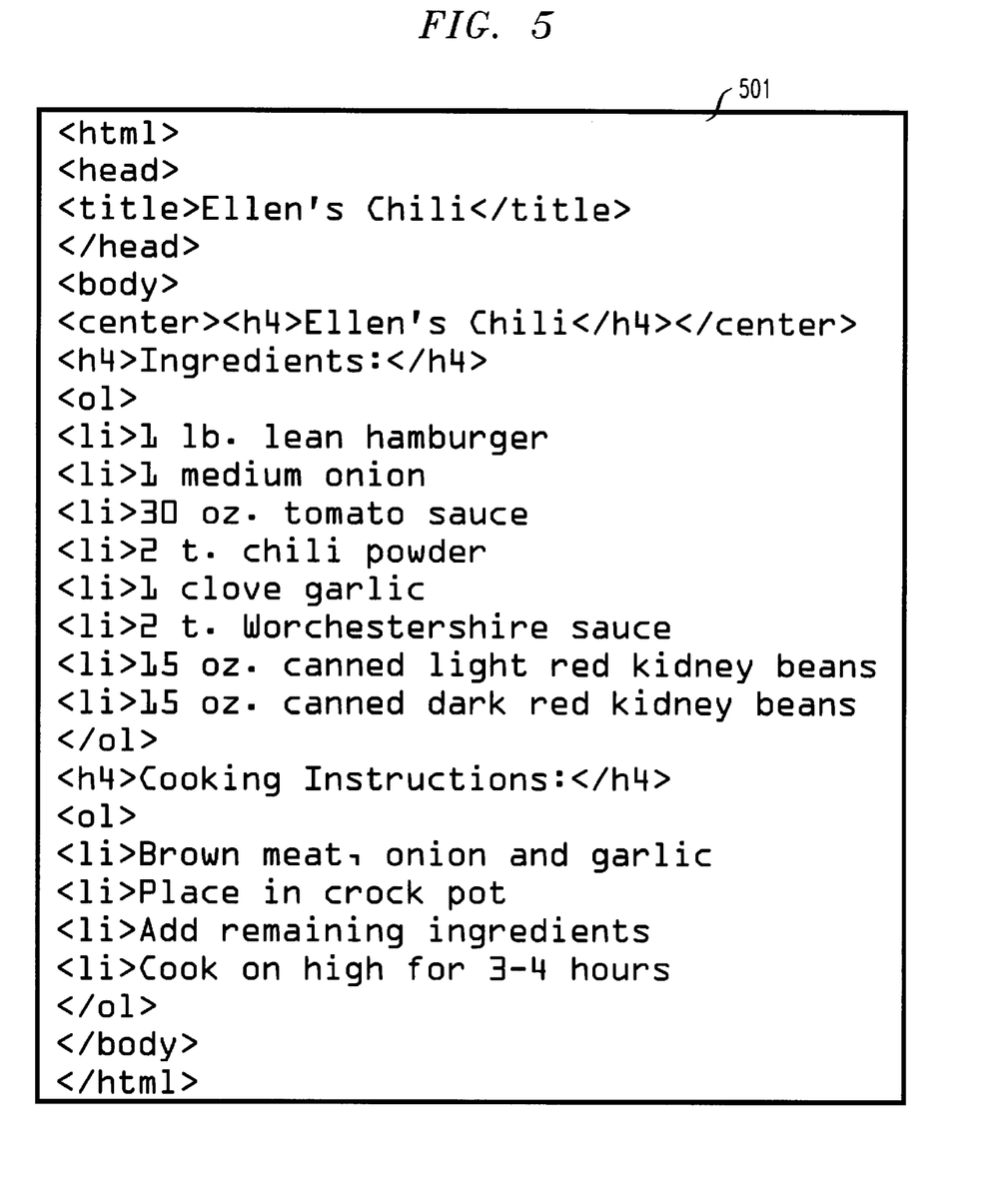
FIG. 5 depicts the contents of the electronic document in FIG. 2 after it has been encoded with HTML, wherein all of the tag characters are in lowercase.
Figure 6:
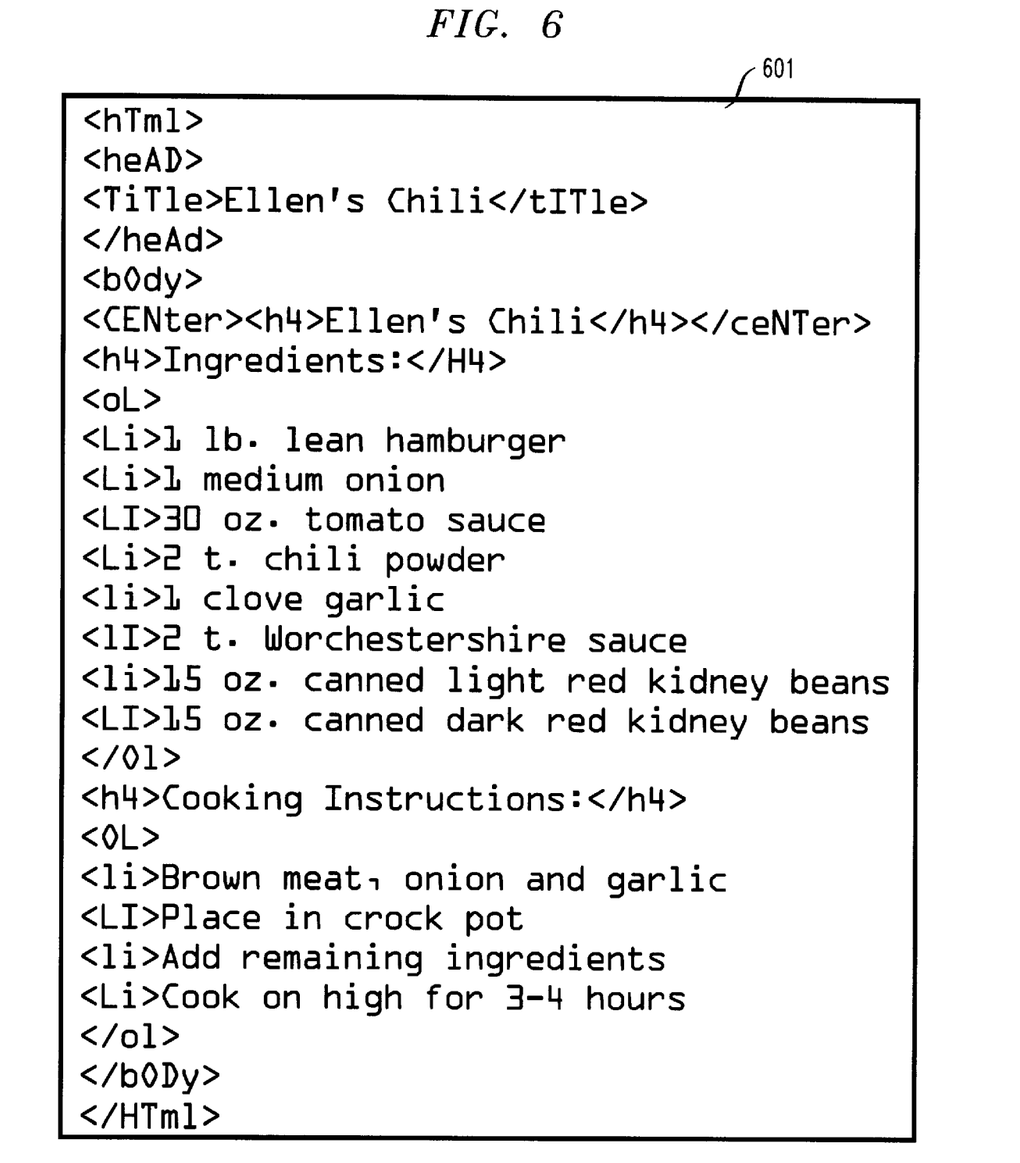
FIG. 6 depicts the contents of the electronic document in FIG. 2 after it has been encoded with HTML, wherein the case of the tag characters is arbitrarily chosen.

FIG. 5 depicts how the document of FIG. 2 has been encoded with HTML, but with all of the tag characters in lowercase. Because HTML is case insensitive, FIG. 4 also depicts how the encoded document of FIG. 5 appears when viewed through an HTML browser. Furthermore, FIG. 6 depicts how the document of FIG. 2 has been encoded with HTML but with some of the tag characters in uppercase and some in lowercase. Again, because HTML is case insensitive, FIG. 4 also depicts how the encoded document of FIG. 6 appears when viewed through an HTML browser.

In step 103, a message is composed to be hidden in the document. The message can comprise text, a number, a graphic, a photograph or any other multimedia element that can be mapped to a binary code. For the purposes of this illustration, the message shall be the text string "© 1996 JPD". Typically, the message is stored electronically in the same computer that holds the electronic document into which it is to be hidden.

In step 105, the message is reduced to a binary code. Typically, this step is performed by the same computer that holds the electronic document as the message to be hidden. According to the illustrative embodiment, each of the 10 characters in the message is converted to an 8-bit binary ASCII string, which are concatenated to form one 80-bit binary string:

10101001001000000011000100111001001111001

0011011000100000010010100101000001000100

Table 1 illustrates how each character is mapped to ASCII.

TABLE 1

| Character | ASCII (Hexadecimal) | ASCII (Binary) |
|---|---|---|
| © | A9 | 10101001 |
| (SPACE) | 20 | 00100000 |
| 1 | 31 | 00110001 |
| 9 | 39 | 00111001 |
| 9 | 39 | 00111001 |
| 6 | 36 | 00110110 |
| (SPACE) | 20 | 00100000 |
| J | 4A | 01001010 |
| P | 50 | 01010000 |
| D | 44 | 01000100 |

It will be clear to those skilled in the art how to reduce a message to other binary codes.

In step 107, the binary string is advantageously augmented with an error correcting code, such as a Hamming Code, to increase the probability that the message can be recovered should the electronic document be edited by a copyright infringer. It will be clear to those skilled in the art how to augment the binary string with an error correcting code. For pedagogical purposes, the binary string in this illustrative example is not augmented with an error correcting code.

In step 109, the case of some or all of the tag characters in the document are modulated with the binary code. For example, because the case of a tag character can be set to either upper or lowercase, the case of that tag character can be modulated to carry one bit of information of the message to be hidden. In the illustrative embodiment, a tag character is modulated to uppercase by a "1" in the binary string and modulated to lowercase by a "0". Alternatively, the tag characters could be modulated according to other systems.

It will be clear to those skilled in the art that there must be at least as many tag characters in the document as there are bits in the binary code if the document is to hold the entire message. If there are more tags characters in the document than in the binary code, then not all of the tag characters need to be modulated. For example, in documents with hundreds of tag characters, into which it is desired that messages of dozens of bits are to be hidden, a nonempty subset of those tag characters is advantageously chosen to be modulated such that the subset reduces the likelihood that a potential infringer will notice the variation in the case of the tag characters. Alternatively, the nonempty subset of tag characters could advantageously be chosen so as to reduce the likelihood that an infringers editing of the document would inexorably destroy the possibility of recovering the hidden message from the document. In yet another alternative embodiment, the message could be hidden multiple times in the document on the theory that the infringers editing is unlikely to destroy all of the copies of the hidden message. In still another alternative embodiment, two or more tag characters can be modulated by a single bit in the binary string.

For example, in an alternative embodiment of the present invention only the paragraph tag characters are modulated while all other tag characters in the document are set to lowercase or are given an arbitrary case. In yet another alternative embodiment, only the first alphabetic character of each tag is modulated. It will be clear to those skilled in the art how to select a subset of tag characters to be modulated such that those tag characters can be unambiguously identified for demodulation.

Returning to the illustrative example, there are 80 bits in the binary code and 84 tag characters in the electronic document. In the illustrative embodiment, the first 80 tag characters in the electronic document will modulated in order (and, therefore, when demodulation occurs, the first 80 tag characters will be demodulated in order). Because the first tag character in the document is the letter "H" in the tag <HTML> and the first bit in the binary string is a "1". Therefore, the tag character is set to an uppercase "H". The second tag character in the document is the letter "T" in the tag <HTML> and the second bit in the binary string is a "0". Therefore, the tag character is set to a lowercase "t". This continues until each of the bits in the binary string have modulated the case of a tag character. The text of the finished electronic document appears in FIG. 7.

Figure 7:
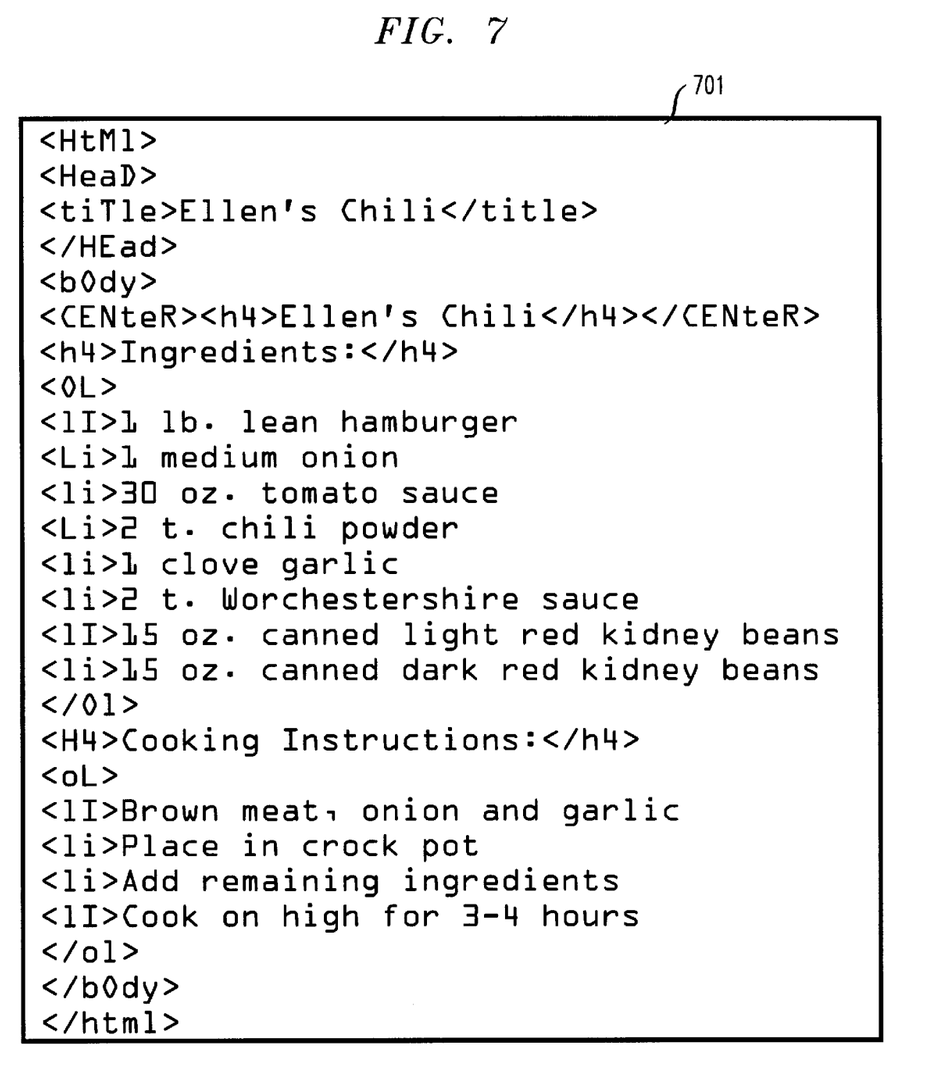
FIG. 7 depicts the contents of the electronic document of FIG. 2 after it has been encoded with HTML and the case of the tag characters has been modulated in conformance with a binary string in accordance with an illustrative embodiment of the present invention.
Figure 9:
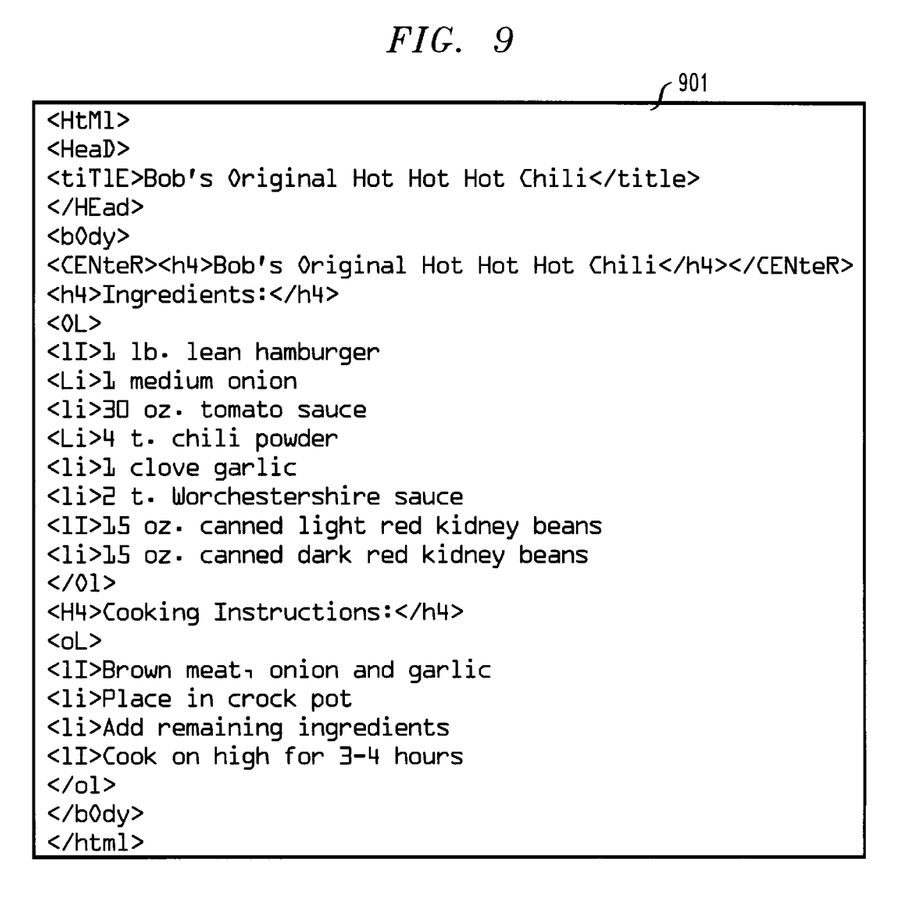
FIG. 9 depicts the contents of the electronic document of FIG. 7 after it has been copied by a copyright infringer and slightly modified in an attempt to conceal the infringement.

If a copyright infringer copies the electronic document of FIG. 7, the hidden message is copied too. And even if the copyright infringer changes the text of the document slightly, as shown in FIG. 9, perhaps even adding or subtracting some tags, the hidden message might still be recoverable, depending on the robustness of the error correction used in step 107. Furthermore, even if the copyright infringer examines the electronic document, it is possible that he or she will either not notice the variation in the case of the tag characters, or will not recognize their significance. This is particularly true if only a small percentage of all of the tag characters in the document are modulated.

When an author or publisher of a copyrighted work encodes an electronic document according to an embodiment of the present invention, the author can provide evidence of copyright infringement by revealing, in court if necessary, the hidden message from the accused infringing work.

Figure 8:
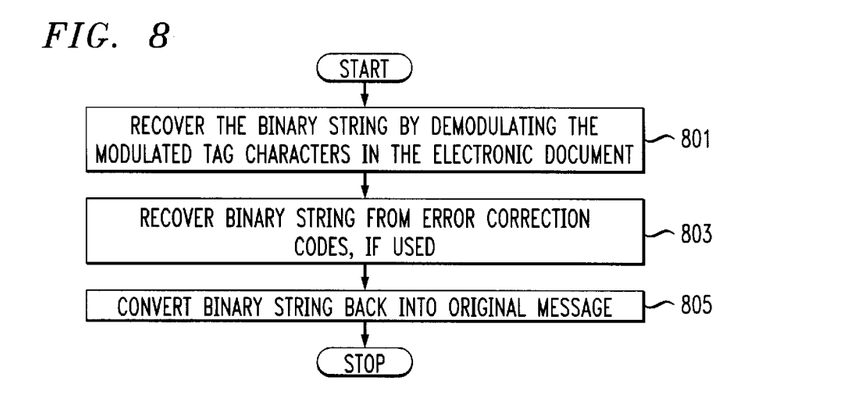
FIG. 8 depicts a flowchart of a method of recovering a hidden message from an electronic document that was hidden in accordance with an embodiment of the present invention.

FIG. 8 depicts a flowchart of an illustrative method for recovering a hidden message from an electronic document. It will clear to those skilled in the art how to recover a hidden message from an electronic document given an embodiment of the present invention. For example, given the illustrative embodiment above, it will be clear to those skilled in the art how to demodulate the first 80 tag characters in the electronic document shown in FIG. 9 to recover the string:

10101001001000000011000100111100100111001
00110110001000000100101001010000010000100

For example, the first bit is a "1" because the "H" in the tag "<HtMl>" is in uppercase. The "t" in "<HtMl>" is lowercase and, therefore, the second bit is a "0". The remainder of the 80 bits are recovered in the same manner. Table 2 illustrates how each 8 bit string is grouped and converted to its ASCII character equivalent.

TABLE 2

| ASCII (Binary) | ASCII (Hexadecimal) | Character |
| --- | --- | --- |
| 10101001 | A9 | © |
| 00100000 | 20 | (SPACE) |
| 00110001 | 31 | 1 |

TABLE 2-continued

| ASCII (Binary) | ASCII (Hexadecimal) | Character |
| --- | --- | --- |
| 00111001 | 39 | 9 |
| 00111001 | 39 | 9 |
| 00110110 | 36 | 6 |
| 00100000 | 20 | (SPACE) |
| 01001010 | 4A | J |
| 01010000 | 50 | P |
| 01000100 | 44 | D |

The result is the extraction of the message "© 1996 JPD", which serves as evidence that the document in FIG. 9 was copied from that in FIG. 7.

What is claimed is:

1. A method comprising:

encoding an electronic document with a plurality of tags from a case insensitive markup language; and modulating the case of at least one tag character in at least one of said plurality of tags with a binary string, wherein said binary string represents a message to be hidden in said electronic document.

2. The method of claim 1 further comprising encoding said binary string with error correction.

3. The method of claim 1 wherein said message represents text.

4. The method of claim 1 wherein said message is a copyright notice.

5. A method comprising:

encoding an electronic document with a plurality of tags from a case insensitive markup language;

reducing a message to be hidden in said electronic document to a binary string;

selecting a nonempty subset of said plurality of tags; and modulating the case of said nonempty subset of said plurality of tags with said binary string.

6. The method of claim 5 further comprising encoding said binary string with error correction.

7. The method of claim 5 wherein said message represents text.

8. The method of claim 5 wherein said message is a copyright notice.

9. A method of recovering a message hidden in an electronic document comprising:

demodulating the case of at least one tag character in at least one of a plurality of tags in said electronic document to recover a binary string, wherein said plurality of tags are from a case insensitive markup language; and converting said binary string into said hidden message.

10. The method of claim 9 further comprising correcting said binary string with an error correction code.

* * * * *